United States Patent
Kardos et al.

(10) Patent No.: US 8,424,303 B2
(45) Date of Patent: Apr. 23, 2013

(54) COOLING ARRANGEMENT FOR A SUPERCHARGED INTERNAL COMBUSTION ENGINE

(75) Inventors: Zoltan Kardos, Södertälje (SE); Erik Söderberg, Stockholm (SE)

(73) Assignee: Scania CV AB (SE)

( * ) Notice: Subject to any disclaimer, the term of this patent is extended or adjusted under 35 U.S.C. 154(b) by 413 days.

(21) Appl. No.: 12/936,529

(22) PCT Filed: Feb. 25, 2009

(86) PCT No.: PCT/SE2009/050207
§ 371 (c)(1),
(2), (4) Date: Nov. 10, 2010

(87) PCT Pub. No.: WO2009/128768
PCT Pub. Date: Oct. 22, 2009

(65) Prior Publication Data
US 2011/0041814 A1    Feb. 24, 2011

(30) Foreign Application Priority Data

Apr. 18, 2008 (SE) ...................................... 0800899

(51) Int. Cl.
*F02B 29/04* (2006.01)
(52) U.S. Cl.
USPC ......... 60/599; 60/605.2; 123/563; 123/41.44; 123/41.31
(58) Field of Classification Search ............ 60/599, 60/605.2; 123/563, 41.44, 41.31
See application file for complete search history.

(56) References Cited

U.S. PATENT DOCUMENTS

| 5,910,099 A | 6/1999 | Jordan, Jr. et al. |
| 6,564,757 B2 * | 5/2003 | Suzuki et al. ............... 123/41.14 |

(Continued)

FOREIGN PATENT DOCUMENTS

| GB | 950020 A | 2/1964 |
| JP | 59138717 A | 8/1984 |

(Continued)

OTHER PUBLICATIONS

International Search Report dated Jul. 15, 2009, issued in corresponding international application No. PCT/SE2009/050207.

*Primary Examiner* — Thomas Denion
*Assistant Examiner* — Thomas Olszewski
(74) *Attorney, Agent, or Firm* — Ostrolenk Faber LLP

(57) ABSTRACT

An arrangement for a supercharged combustion engine (2) including a first cooling system with a circulating coolant, a second cooling system with a circulating coolant which is at a lower temperature than the coolant in the first cooling system, and a cooler (10, 15) in which a gaseous medium which contains water vapor is to be cooled by the coolant in the second cooling system. A first valve (32) which can be placed in a first position whereby it prevents coolant from the first cooling system from being led to the second cooling system via a first connecting line (30), and a second position whereby it allows warm coolant from the first cooling system to be led to the second cooling system via the first connecting line (30). The warm coolant from the first cooling system is intended to circulate at least a certain distance (26*b, c*) in the second cooling system so that it passes through the cooler (10, 15).

8 Claims, 1 Drawing Sheet

U.S. PATENT DOCUMENTS

| | | | |
|---|---|---|---|
| 6,604,515 B2 * | 8/2003 | Marsh et al. | 123/563 |
| 6,899,162 B2 * | 5/2005 | Hohl et al. | 165/41 |
| 7,617,679 B2 * | 11/2009 | Kardos et al. | 60/605.2 |
| 7,669,416 B2 * | 3/2010 | Pantow et al. | 60/599 |
| 7,874,154 B2 * | 1/2011 | Raab et al. | 60/599 |
| 8,015,954 B2 * | 9/2011 | Kardos | 123/41.12 |
| 8,028,523 B2 * | 10/2011 | Wikstrom et al. | 60/605.2 |
| 8,215,381 B2 * | 7/2012 | Schwartz et al. | 165/298 |
| 8,336,528 B2 * | 12/2012 | Hori et al. | 123/568.12 |
| 2005/0000473 A1 | 1/2005 | Ap et al. | |
| 2006/0117748 A1 * | 6/2006 | Bundschuh et al. | 60/599 |
| 2006/0213463 A1 | 9/2006 | Wikstrom | |
| 2006/0236987 A1 * | 10/2006 | Guerrero | 123/542 |
| 2007/0199318 A1 * | 8/2007 | Wood | 60/599 |
| 2008/0190109 A1 * | 8/2008 | Kardos et al. | 60/605.2 |
| 2009/0020079 A1 * | 1/2009 | Muller et al. | 123/41.1 |
| 2009/0217660 A1 * | 9/2009 | Ranini et al. | 60/599 |
| 2011/0146266 A1 * | 6/2011 | Weinbrenner et al. | 60/599 |

FOREIGN PATENT DOCUMENTS

| | | |
|---|---|---|
| WO | WO 2007/031670 A1 | 3/2007 |
| WO | WO 2007/122345 A1 | 11/2007 |
| WO | WO 2007122345 A1 * | 11/2007 |
| WO | WO 2008/080872 A1 | 7/2008 |
| WO | WO 2008080872 A1 * | 7/2008 |

\* cited by examiner

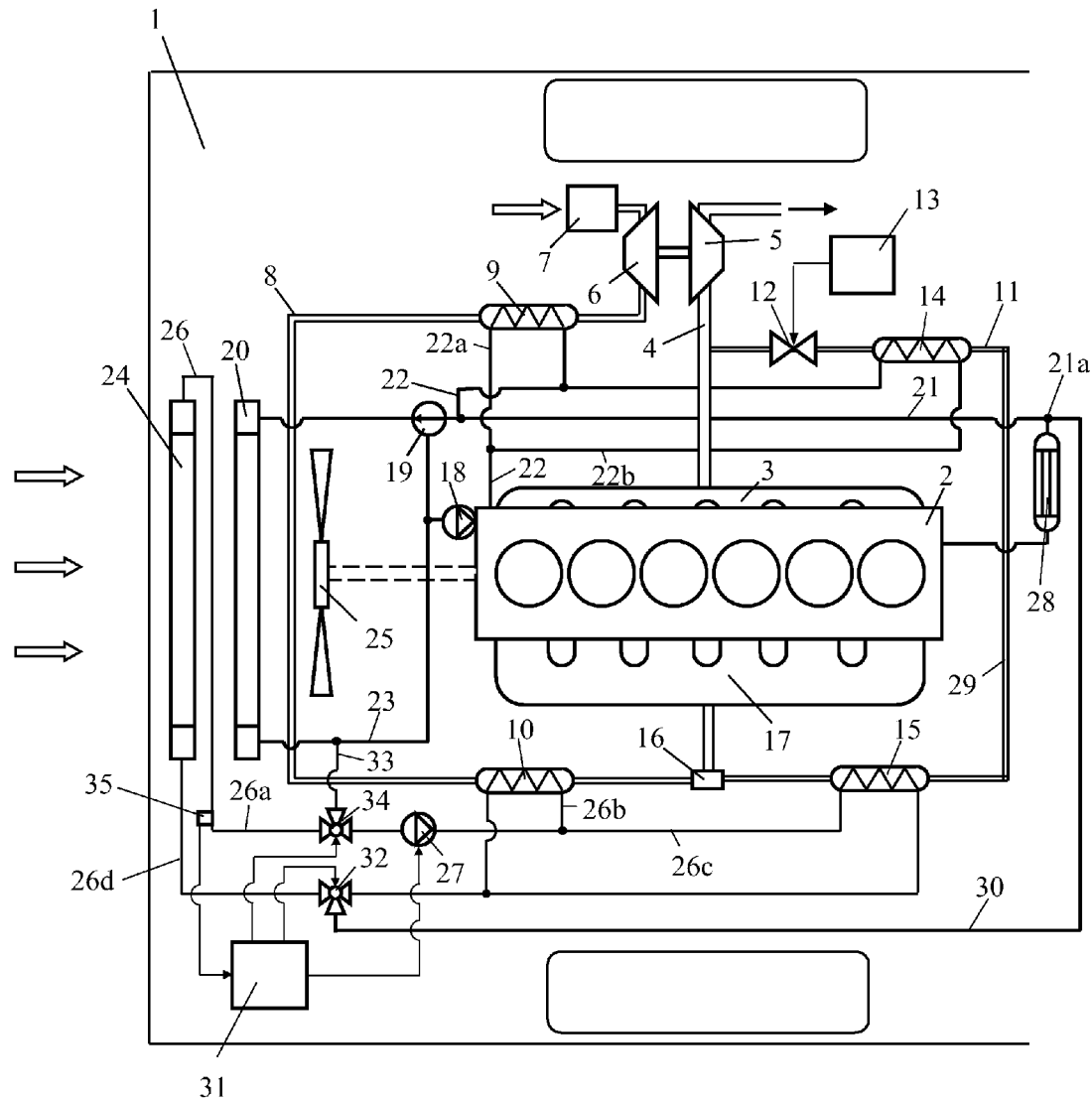

COOLING ARRANGEMENT FOR A SUPERCHARGED INTERNAL COMBUSTION ENGINE

CROSS-REFERENCE TO RELATED APPLICATIONS

The present application is a 35 U.S.C. §§371 national phase conversion of PCT/SE2009/050207, filed Feb. 25, 2009, which claims priority of Swedish Application No. 0800899-7, filed Apr. 18, 2008, the contents of which are incorporated by reference herein. The PCT International Application was published in the English language.

BACKGROUND TO THE INVENTION, AND STATE OF THE ART

The present invention relates to a cooling arrangement for a supercharged combustion engine.

The amount of air which can be supplied to a supercharged combustion engine depends on the pressure of the air but also on the temperature of the air. Supplying the largest possible amount of air to the combustion engine entails effective cooling of the air before it is led to the combustion engine. Compressed air may be subjected to a first step of cooling in a first charge air cooler which is cooled by coolant from the combustion engine's cooling system, and to a second step of cooling in a second charge air cooler which is cooled by coolant from a cooling system in which the coolant is at a significantly lower temperature than in the combustion engine's cooling system. Such a low-temperature cooling system makes it possible for the compressed air to be cooled to a temperature close to the temperature of the surroundings. In cold weather conditions, the compressed air is subjected to the second step of cooling to a temperature which may be below the dewpoint temperature of the air, resulting in precipitation of water vapour in liquid form in the charge air cooler. When the temperature of the surrounding air is below 0° C., there is also risk that the precipitated water may freeze to ice within the charge air cooler. Such ice formation will cause a greater or lesser amount of obstruction of the airflow ducts within the charge air cooler, resulting in a reduced flow of air to the combustion engine and consequent operational malfunctions or stoppages.

The technique known as EGR (Exhaust Gas Recirculation) is a known way of recirculating part of the exhaust gases from a combustion process in a combustion engine. The recirculating exhaust gases are mixed with the inlet air to the combustion engine before the mixture is led to the cylinders of the combustion engine. Adding exhaust gases to the air causes a lower combustion temperature, resulting inter alia in a reduced content of nitrogen oxides $NO_x$ in the exhaust gases. This technique is used both for Otto engines and for diesel engines. Supplying a large amount of exhaust gases to the combustion engine entails effective cooling of the exhaust gases before they are led to the combustion engine. The exhaust gases may be subjected to a first step of cooling in an EGR cooler which is cooled by coolant from the combustion engine's cooling system, and to a second step of cooling in an EGR cooler which is cooled by coolant from a low-temperature cooling system. The exhaust gases can thus likewise be cooled to a temperature close to the temperature of the surroundings. Exhaust gases contain water vapour which condenses within the EGR cooler when the exhaust gases undergo the second step of cooling to a temperature below the dewpoint of the water vapour. When the temperature of the surrounding air is below 0° C., there is also risk that the condensate formed may freeze to ice within the second EGR cooler. Such ice formation would cause a greater or lesser amount of obstruction of the exhaust gas flow ducts within the EGR cooler. If the EGR cooler is obstructed and the recirculation of exhaust gases ceases or is reduced, the result will be an increased content of nitrogen oxides in the exhaust gases.

SUMMARY OF THE INVENTION

The object of the present invention is to provide an arrangement whereby a gaseous medium which contains water vapour can be subjected to very good cooling in a radiator while at the same time the risk of the radiator being obstructed is substantially eliminated.

This object is achieved with the arrangement of the invention whereby an arrangement for a supercharged combustion engine including a first cooling system with a circulating coolant, a second cooling system with a circulating coolant which is at a lower temperature than the coolant in the first cooling system, and a cooler in which a gaseous medium which contains water vapor is to be cooled by the coolant in the second cooling system. The arrangement also comprising a first valve which can be placed in a first position whereby it prevents coolant from the first cooling system from being led to the second cooling system via a first connecting line, and a second position whereby it allows warm coolant from the first cooling system to be led to the second cooling system via the first connecting line. The warm coolant from the first cooling system is intended to circulate at least a certain distance in the second cooling system so that it passes through the cooler.

For it to be possible for the gaseous medium to be effectively cooled, it needs to be cooled by a coolant which is at a low temperature. However, if the coolant in the second cooling system is colder than 0° C., there is obvious risk that the water which has condensed in the radiator of the second system may freeze to ice. The lower the temperature of the coolant in the second cooling system, the greater is this risk. The arrangement therefore comprises also a first cooling system with a warmer coolant than the coolant in the second cooling system. The first cooling system is with advantage the cooling system which cools the combustion engine, in which the coolant may be at a temperature of the order of 80-85° C. According to the invention, a connecting line with a first valve means is used to make it possible to supply warm coolant from the first cooling system to the second cooling system. During normal operation of the combustion engine, the first valve means is placed in a first position whereby coolant from the first system is prevented from being led to the second cooling system. When the first valve means is placed in a second position, warm coolant from the first cooling system is allowed to be led to the second cooling system, in which the coolant is led in a direction such that it passes through the radiator. Such a supply of warmer coolant to the radiator in the second cooling system is favorable in situations where ice formation might occur in the radiator. If ice has formed within the radiator, the warm coolant from the first cooling system will melt the ice quickly and effectively. When the ice has melted, the first valve means is placed back in its first position. With such an arrangement, the gaseous medium can provide very good cooling in the radiator while at the same time any ice formation in the radiator can be eliminated simply and effectively.

According to a preferred embodiment of the invention, the arrangement comprises a second connecting line which connects the first cooling system to the second cooling system, and a second valve means which can be placed in a first position whereby it prevents coolant from the second cooling system from being led to the first cooling system via said second connecting line, and a second position whereby it allows the coolant which has passed through the radiator to be led back to the first cooling system via said second connecting line. Such a second connecting line makes it possible for the coolant to be led back to the first cooling system as soon as it has passed the portion of the second cooling system which comprises the radiator. With advantage, the flow of the cold coolant in the second system is halted in situations where warm coolant is supplied to the second cooling system. To this end, the control unit may halt the operation of a pump or the like which is adapted to circulating the existing coolant in the second cooling system.

According to a preferred embodiment of the invention, the arrangement comprises a control unit adapted to controlling the respective valve means and at least one sensor adapted to detecting a parameter which indicates whether the gaseous medium is cooled to such an extent that there is ice formation or risk of ice formation in the radiator, the control unit being adapted to receiving information from said sensor and to deciding whether there is ice formation or risk of ice formation in the radiator and, if so, to placing the first valve means and the second valve means in the second position. Such a control unit makes it possible for the valve means to be placed automatically in their second position as soon as ice formation occurs or is suspected of occurring in the radiator. The control unit may be a computer unit with software suitable for this purpose. Said sensor may be a temperature sensor which detects the temperature of the coolant in the second cooling system. If the temperature of the coolant is definitely below 0° C. when it is led into the radiator, there is obvious risk that ice formation may occur in the radiator. The arrangement may alternatively comprise temperature sensors or pressure sensors adapted to detecting a parameter which is related to the pressure drop or temperature drop of the gaseous medium in the radiator. If the pressure drop or temperature drop in the radiator does not conform to acceptable values, the control unit may find that the flow passages in the radiator have at least partly become obstructed. In such cases, the control unit places the valve means in their second positions so that the warm coolant from the first cooling system flows through the radiator so that the warm coolant melts the ice in the radiator. When the control unit receives information from the sensors which indicates that the pressure drop or temperature drop in the radiator has reverted to acceptable values, it may be found that the ice has melted, whereupon the control unit will place the valve means back in their respective first positions. Alternatively, the valve means may be operated manually. A person may thus place the valve means in their second positions in situations where ice formation occurs in the radiator.

According to another preferred embodiment of the invention, the first valve means can be placed in a third position in which it allows warm coolant from the first cooling system to be led to the second cooling system via said first connecting line, the warm coolant from the first cooling system being intended to circulate at least a certain distance in the second cooling system so that it passes through an existing radiator element in the second cooling system. In this case the warm coolant may be circulated in the second cooling system in an opposite direction to the case where the first valve means is in the second position. The coolant may thus be circulated a further distance in the second cooling system which comprises the radiator element. The second valve means may also be capable of being placed in a third position in which it allows coolant which has passed through the radiator element to be led back to the first cooling system via said second connecting line. The first valve means and the second valve means are with advantage three-way valves. In situations where the coolant in the first cooling system is at too high a temperature, the valve means may be placed in their third position. The coolant in the first cooling system can therefore use not only the existing radiator element in the first cooling system but also an existing radiator element in the second cooling system to cool the coolant. The first cooling system can thus temporarily be provided with an increased cooling capacity.

According to another preferred embodiment of the invention, the arrangement comprises a control unit adapted to receiving information which indicates whether there is overheating or risk of overheating of the coolant in the first system and, if so, to placing the first valve means and the second valve means in the third position. In this case, automatic repositioning of the various valve means takes place when there is risk of overheating of the coolant in the first cooling system. The first cooling system may comprise an oil cooler for a retarder and the control unit may be adapted to placing the first valve means and the second valve means in the second position when the retarder is activated. The braking capacity of a retarder is usually limited by the ability of the cooling system to cool away the thermal energy evolved during the retarder's braking process. The control unit may place the valve means in their respective third positions as soon as the retarder is activated. Alternatively, during a retarder braking, the control unit may place the valve means in their third positions when the coolant in the first cooling system exceeds a predetermined temperature. Here again, it is also possible for the valve means to be operated manually. A person may thus place the valve means in their third positions in situations where the first cooling system is under severe load.

According to another preferred embodiment of the invention, the radiator element in the second cooling system is adapted to having a cooling airflow at the temperature of the surroundings passing through it. The coolant can thus be cooled to a temperature close to the temperature of the surroundings in the radiator element. Said cooler may be a charge air cooler for cooling of compressed air which is led to the combustion engine. To make it possible to supply an optimum amount of air to a combustion engine, the air needs to be cooled to a temperature close to the temperature of the surroundings. Said cooler may also be an EGR cooler for cooling of exhaust gases which are recirculated to the combustion engine. To make it possible to supply an optimum amount of recirculating exhaust gases to a combustion engine, the exhaust gases need to be cooled to a temperature close to the temperature of the surroundings. With advantage, the second cooling system is used for cooling both the compressed air in a charge air cooler and the recirculating exhaust gases in an EGR cooler. To this end, the first cooling system may be used for subjecting the compressed air and the recirculating exhaust gases to a first step of cooling before they undergo a second step of cooling by the second cooling system.

BRIEF DESCRIPTION OF THE DRAWING

A preferred embodiment of the invention is described below by way of example with reference to the attached drawing, in which:

FIG. 1 depicts an arrangement for a supercharged combustion engine according to an embodiment of the invention.

DETAILED DESCRIPTION OF A PREFERRED EMBODIMENT OF THE INVENTION

FIG. 1 depicts an arrangement for a supercharged combustion engine intended to power a schematically depicted vehicle 1. The combustion engine is here exemplified as a diesel engine 2. The diesel engine 2 may be used to power a heavy vehicle 1. The exhaust gases from the cylinders of the diesel engine 2 are led via an exhaust manifold 3 to an exhaust line 4. The diesel engine 2 is provided with a turbo unit which comprises a turbine 5 and a compressor 6. The exhaust gases in the exhaust line 4, which are at above atmospheric pressure, are led initially to the turbine 5. The turbine 5 is thus provided with driving power which is transferred, via a connection, to the compressor 6. The compressor 6 compresses air which is drawn into an air inlet line 8 via an air filter 7. The air in the inlet line 8 is cooled initially in a coolant-cooled first charge air cooler 9. The air is cooled in the first charge air cooler 9 by coolant from the combustion engine's cooling system. The compressed air is thereafter cooled in a coolant-cooled second charge air cooler 10. The air is cooled in the second charge air cooler 10 by coolant from a second cooling system in which the coolant is at a lower temperature than the coolant in the combustion engine's cooling system.

The arrangement comprises a return line 11 for effecting recirculation of part of the exhaust gases in the exhaust line 4. The return line 11 has an extent between the exhaust line 4 and the inlet line 8. The return line 11 comprises an EGR valve 12 by which the exhaust flow in the return line 11 can be shut off. The EGR valve 12 can also be used for steplessly controlling the amount of exhaust gases which is led from the exhaust line 4 to the inlet line 8 via the return line 11. A first control unit 13 is adapted to controlling the EGR valve 12 on the basis of information about the current operating state of the diesel engine 2. The return line 11 comprises a coolant-cooled first EGR cooler 14 for subjecting the exhaust gases to a first step of cooling. The exhaust gases are cooled in the first EGR cooler 14 by coolant from the combustion engine's cooling system. The exhaust gases undergo a second step of cooling in a coolant-cooled second EGR cooler 15. The exhaust gases are cooled in the second EGR cooler 15 by coolant from the second cooling system.

In certain operating situations in supercharged diesel engines 2, the pressure of the exhaust gases in the exhaust line 4 will be lower than the pressure of the compressed air in the inlet line 8. In such operating situations it is not possible to mix the exhaust gases in the return line 11 directly with the compressed air in the inlet line 8 without special auxiliary means.

To this end it is possible to use, for example, a venturi 16 or a turbo unit with variable geometry. If instead the combustion engine 2 is a supercharged Otto engine, the exhaust gases in the return line 11 can be led directly into the inlet line 8, since the exhaust gases in the exhaust line 4 of an Otto engine in substantially all operating situations will be at a higher pressure than the compressed air in the inlet line 8. After the exhaust gases have mixed with the compressed air in the inlet line 8, the mixture is led to the respective cylinders of the diesel engine 2 via a manifold 17.

The combustion engine 2 is cooled in a conventional manner by a cooling system which contains a circulating coolant. The coolant in the cooling system is circulated by a coolant pump 18. The main flow of coolant is circulated through and cools the combustion engine 2. After the coolant has cooled the combustion engine 2, it is led in a line 21 to an oil cooler element 28 for a retarder. After the coolant has cooled the oil in the oil cooler element 28, it is led in the line 21 to a thermostat 19. When the coolant has reached a normal operating temperature, the thermostat 19 is adapted to leading it to a radiator 20 fitted at a forward portion of the vehicle, in order to be cooled. A line 23 leads the cooled coolant back to the combustion engine 2. A smaller portion of the coolant in the cooling system is nevertheless not led back to the combustion engine 2 but is circulated through a line 22 which divides into two parallel lines 22a, 22b. The line 22a leads coolant to the first charge air cooler 9, in which it subjects the compressed air to a first step of cooling. The line 22b leads coolant to the first EGR cooler 14, in which it subjects the recirculating exhaust gases to a first step of cooling. The coolant which has cooled the air in the first charge air cooler 9 and the coolant which has cooled the exhaust gases in the first EGR cooler 14 are reunited in the line 22 before the coolant is led back to the line 21 at a location upstream of the thermostat 19. The coolant can thereafter be led to the radiator 20 or the coolant pump 18.

The second cooling system comprises a radiator element 24 fitted in front of the radiator 20 in a peripheral region of the vehicle 1. In this case the peripheral region is situated at a front portion of the vehicle 1. A radiator fan 25 is adapted to generating a flow of surrounding air through the radiator element 24 and the radiator 20. As the radiator element 24 is situated in front of the radiator 20, the coolant in the radiator element 24 is cooled by air at the temperature of the surroundings. The coolant in the radiator element 24 can thus be cooled to a temperature close to the temperature of the surroundings. The cold coolant from the radiator element 24 is circulated in the second cooling system in a line system 26 by a pump 27. A first connecting line 30 connects the combustion engine's cooling system to the second cooling system. The first connecting line 30 has an extent from a location 21a in the line 21 to a first three-way valve 32. The coolant in the combustion engine's cooling system is at its highest temperature at said location 21a. The first three-way valve 32 is arranged in a connection region between the first connecting line and a line 26d of the line system 26. A second three-way valve 34 is arranged in the line system 26. The second three-way valve 34 is connected to a second connecting line 33 which extends between the second cooling system and the line 23 of the combustion engine's cooling system. The second three-way valve 34 is arranged in a line 26a of the line system 26 which contains cold coolant which has just been cooled in the radiator 24. The line 26a divides into two parallel lines 26b, 26c. The line 26b is adapted to leading cold coolant to the second charge air cooler 10, in which it subjects the compressed air to a second step of cooling. The line 26c is adapted to leading cold coolant to the second EGR cooler 15, in which it subjects the recirculating exhaust gases to a second step of cooling. After the coolant has passed through the second charge air cooler 10 and the second EGR cooler 15, the lines 26b, 26c reunite in the line 26d, which leads the coolant to the radiator 24. A second control unit 31 is adapted to controlling the three-way valves 32, 34.

During operation of the diesel engine 2, exhaust gases flow through the exhaust line 4 and drive the turbine 5. The turbine 5 is thus provided with driving power which drives the compressor 6. The compressor 6 draws surrounding air in via the air filter 7 and compresses the air in the inlet line 8. The air thus acquires an increased pressure and an increased temperature. The compressed air is cooled in the first charge air cooler 9 by the radiator liquid in the combustion engine's cooling system. The radiator liquid may here be at a temperature of about 80-85° C. Thus the compressed air can undergo in the first charge air cooler 9 a first step of cooling to a temperature close to the temperature of the coolant. During normal operation, the control unit 31 is adapted to keeping the second three-way valve 34 in a first position in which coolant from the line 26a is led to the lines 26b, 26c. The cold coolant in the line 26b cools the compressed air in the second charge air cooler 10. The coolant may here be at a temperature close to the temperature of the surroundings. Thus the compressed air can in favourable circumstances be cooled to a temperature close to the temperature of the surroundings in the second charge air cooler 10.

In most operating states of the diesel engine 2, the first control unit 13 will keep the EGR valve 12 open so that part of the exhaust gases in the exhaust line 4 is led into the return line 11. The exhaust gases in the exhaust line 4 may be at a temperature of about 500-600° C. when they reach the first EGR cooler 14. In the first EGR cooler 14, the recirculating exhaust gases are subjected to a first step of cooling by the coolant in the combustion engine's cooling system. The coolant in the combustion engine's cooling system will thus be at a relatively high temperature but definitely below the temperature of the exhaust gases. It is thus possible to effect good cooling of the exhaust gases in the first EGR cooler 14. During normal operation, the control unit 31 is therefore adapted to keeping the second three-way valve 34 in a first position such that cold coolant from the line 26a is led to the lines 26b, 26c. The cold coolant in the line 26c cools the recirculating exhaust gases in the second EGR cooler 15. The coolant may thus here be at a temperature close to the temperature of the surroundings. In favourable circumstances, the recirculating exhaust gases can therefore likewise be cooled to a temperature close to the temperature of the surroundings in the second EGR cooler 15. Exhaust gases in the return line 11 can thus undergo cooling to substantially the same low temperature as the compressed air before they mix and are led to the combustion engine 2. A substantially optimum amount of air and recirculating exhaust gases can therefore be led into the combustion engine. Combustion in the combustion engine with substantially optimum performance is thus made possible. The low temperature of the compressed air and the recirculating exhaust gases also results in a low combustion temperature and a low content of nitrogen oxides in the exhaust gases.

This effective cooling of the compressed air and the recirculating exhaust gases also has disadvantages. The compressed air is cooled in the second charge air cooler 10 to a temperature at which water in liquid form condenses in the charge air cooler 10. Similarly, the exhaust gases in the second EGR cooler 15 are cooled to a temperature at which condensate forms within the second EGR cooler 15. When the temperature of the surrounding air is below 0° C., there is also risk that the precipitated water in the second charge air cooler 10 and the precipitated condensate in the second EGR cooler 15 may freeze to ice. Ice formation within the second charge air cooler 10 and the second EGR cooler 15 might seriously disturb the operation of the combustion engine 2. The second control unit 31 is adapted to receiving from at least one sensor information which indicates whether ice has formed or there is risk of ice forming in the second charge air cooler 10 and/or the second EGR cooler 15. FIG. 1 depicts such a sensor 35 which detects the temperature of the coolant in the line 26a in the second cooling system. If the coolant in the line 26a is at a temperature which is definitely below 0° C., there is obvious risk that ice may form in the second charge air cooler 10 and/or in the second EGR cooler 15. The control unit 31 may alternatively receive information from two or more temperature sensors. One such temperature sensor may measure the temperature of the compressed air after it has been cooled in the second charge air cooler 10, and another temperature sensor may measure the temperature of the recirculating exhaust gases after they have been cooled in the second EGR cooler 15. If the compressed air and/or the recirculating exhaust gases is/are at a temperature below 0° C., it means that ice is about to form within the charge air cooler 10 and/or within the second EGR cooler 15.

If it receives information which indicates that there is risk of ice formation or that ice has formed within either of the coolers 10, 15, the second control unit 31 halts the operation of the pump 27. The second control unit 31 places the first three-way valve 32 in a second position such that warm coolant from the combustion engine's cooling system is led to the second cooling system via the first connecting line 30. In the second position, the first three-way valve 32 leads the warm coolant in an opposite direction to the normal direction of flow in the second cooling system. The warm coolant from the combustion engine's cooling system will thus flow in the reverse direction through the second charge air cooler 10 and the second EGR cooler 15. The warm coolant will quickly melt any ice which has formed within the charge air cooler 10 and/or the second EGR cooler 15. After the coolant has passed through the coolers 10, 15, it flows past the pump 27. The configuration of the pump 27 is such that in the switched-off state it allows the coolant to flow through it in a counter flow direction. The second control unit 31 also places the second three-way valve 34 in a second position such that the coolant which has flowed in the reverse direction through the second charge air cooler 10 and the second EGR cooler 15 is led back to the combustion engine's cooling system via the second connecting line 33. After a predetermined time or when the second control unit 31 receives information which indicates that the ice has melted in the charge air cooler 10 and/or the second EGR cooler 15, the second control unit 31 places the three-way valves 32, 34 back in their respective first positions. Any ice formation in the charge air cooler 10 and/or the second EGR cooler 15 can thus be eliminated in a simple and effective manner.

The vehicle 1 is in this case equipped with an oil-cooled retarder. The retarder oil is cooled in the oil cooler element 28 by the coolant in the combustion engine's cooling system. The braking capacity of a retarder is usually limited by the ability of the cooling system to cool away the thermal energy generated when the retarder is activated. The second control unit 31 is adapted to receiving information when the retarder is activated. When this takes place, the second control unit 31 switches off the pump 27 in the second cooling system. The second control unit also places the three-way valves 32, 34 in a third position. The first three-way valve 32 thereupon leads warm coolant from the combustion engine's cooling system to the second cooling system via the first connecting line 30. In this case the first three-way valve 32 leads the warm coolant in so that it is circulated in the normal direction of flow in the second cooling system. The warm coolant is led from the first three-way valve 32 to the radiator element 24, in which it is cooled by air at the temperature of the surroundings. The coolant undergoes effective cooling here before it is led to the second three-way valve 34 via the line 26a. The second three-way valve 34, which has thus also been placed in a third position, leads the coolant back to the combustion engine's cooling system via the first connecting line 33.

When the second control unit 31 receives information which indicates that the retarder has been deactivated, it places the three-way valves 32, 34 back in their first positions, after which the pump 27 is activated so that normal circulation of coolant is resumed in the second cooling system. During activation of the retarder, coolant which has cooled the oil in the oil cooler 28 is thus partly led to the combustion engine's radiator 20 and partly to the second cooling system's radiator element 24. This means that the coolant undergoes considerably improved cooling when the retarder is activated. The result is that the retarder can be activated for a significantly longer time before the coolant reaches a maximum acceptable temperature. Braking of the vehicle 1 by means of the retarder can therefore be used to a greater extent. Alternatively, when the retarder is activated, the control unit 31 may delay placing the three-way valves 32, 34 in their third positions until it receives information, e.g. from a temperature sensor, which indicates that the coolant in the combustion engine's cooling system has exceeded a predetermined temperature.

The invention is in no way limited to the embodiment to which the drawing refers but may be varied freely within the scopes of the claims. The arrangement may also be used for keeping only one of said coolers 10, 15 substantially free from ice. In the embodiment depicted, the valve means 32, 34 are placed in their third positions when the cooling of a retarder imposes load upon the combustion engine's cooling system. It is possible, however, that the cooling of other components of the vehicle or a very severely loaded combustion engine may cause the coolant in the combustion engine's cooling system to become overheated. In such situations it is also possible for the valve means 32, 34 to be placed in their third positions in order to cool the coolant in the combustion engine's cooling system.

The invention claimed is:

1. A cooling arrangement for a supercharged combustion engine comprising:
    a first cooling system configured for circulating a first coolant;
    a second cooling system configured for circulating a second coolant wherein the first and second cooling systems are configured such that during normal operation of the combustion engine, the second coolant is at a lower temperature than the first coolant in the first cooling system;
    a cooler configured and positioned for cooling a gaseous medium which contains water vapour and is intended to be cooled, wherein the cooler is positioned at the second cooling system to cool the cooler by the coolant in the second cooling system;
    a first connecting line connecting the first cooling system to the second cooling system, a second connecting line connecting the first cooling system to the second cooling system;
    a first valve between the first and second connecting lines and which has a first position at which the first valve prevents first coolant from the first cooling system from being led to the second cooling system via the first connecting line, and has a second position at which the first valve allows warm first coolant from the first cooling system to be led to the second cooling system via the first connecting line, wherein the second cooling system is configured such that the warm first coolant from the first cooling system circulates at least a certain distance in the second cooling system so that the first coolant passes through the cooler;
    the first valve has a third position at which the first valve allows warm first coolant from the first cooling system to be led to the second cooling system via the first connecting line and to circulate at least a distance in the second cooling system so that the second coolant passes through an existing radiator element in the second cooling system;
    a second valve at the second connecting line which has respective first position at which the second valve prevents second coolant from the second cooling system from being led to the first cooling system via the second connecting line, the second valve has a respective second position at which the second valve allows the coolant which has passed through the cooler to be led back to the first cooling system via the second connecting line, and the second valve has a respective third position at which the second valve allows coolant which has passed through the radiator element to be led back to the first cooling system via the second connecting line.

2. An arrangement according to claim 1, further comprising:
    a control unit configured and connected to control the respective first and second valves;
    at least one sensor configured and connected to detect a parameter which indicates whether the gaseous medium passing the cooler is cooled to such an extent that there is ice formation or risk of ice formation in the cooler, the control unit is configured for receiving information from the sensor and for deciding whether there is ice formation or risk of ice formation in the cooler and, if there is ice formation or a risk of ice formation in the cooler, the control unit placing the first valve and the second valve in their respective second positions.

3. An arrangement according to claim 2, wherein the control unit is configured for receiving information which indicates whether there is overheating or risk of overheating of the first coolant in the first cooling system and, if there is such overheating or a risk thereof, the control unit places the first valve and the second valve in their respective third positions.

4. An arrangement according to claim 3, further comprising the first cooling system comprises an oil cooler for a vehicle retarder and the control unit places the first valve and the second valve in the third positions thereof when the retarder is activated.

5. An arrangement according to claim 1, further comprising a radiator element in the second cooling system configured to having a cooling air flow at the temperature of the surroundings passing through it.

6. An arrangement according to claim 1, further comprising a line for compressed air to be led to the combustion engine, and
    the cooler is a charge air cooler positioned for cooling of the compressed air which is led to the combustion engine.

7. An arrangement according to claim 1, further comprising a line for exhaust gases to be led from the combustion engine, to pass through the cooler to be cooled thereby and then to be led to the combustion engine, and
    the cooler is an EGR cooler positioned for cooling of the exhaust gases which are recirculated to the combustion engine.

8. An arrangement according to claim 6, further comprising a line for exhaust gases to be led from the combustion engine, to pass through the second cooler to be cooled thereby and then to be led to the combustion engine, and
    the second cooler is an EGR cooler positioned for cooling of the exhaust gases which are recirculated to the combustion engine.

* * * * *

UNITED STATES PATENT AND TRADEMARK OFFICE
CERTIFICATE OF CORRECTION

PATENT NO. : 8,424,303 B2
APPLICATION NO. : 12/936529
DATED : April 23, 2013
INVENTOR(S) : Kardos et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this
Eighth Day of September, 2015

Michelle K. Lee
*Director of the United States Patent and Trademark Office*